United States Patent [19]
Gupta et al.

[11] Patent Number: 5,226,044
[45] Date of Patent: Jul. 6, 1993

[54] LOW-RATE ENCODING/DIGITAL SPEECH INTERPOLATION SYSTEM

[75] Inventors: Vaikunth N. Gupta, Gaithersburg; Michael Onufry, Jr., Clarksburg; Jack H. Rieser, Middletown; Henri G. Suyderhoud, Potomac; Krishnamoorthy Virupaksha, Rockville, all of Md.

[73] Assignee: Comsat, Washington, D.C.

[21] Appl. No.: 715,696

[22] Filed: Jun. 17, 1991

Related U.S. Application Data

[63] Continuation of Ser. No. 748,385, Jun. 25, 1985, abandoned.

[51] Int. Cl.⁵ .............................................. H04J 3/17
[52] U.S. Cl. .................................... 370/81; 370/84; 370/99
[58] Field of Search .......................... 370/43, 79, 80, 81, 370/82, 83, 84, 99, 113, 118; 375/25, 27, 30, 34, 122; 381/29, 30, 31

[56] References Cited

U.S. PATENT DOCUMENTS

| | | | |
|---|---|---|---|
| 4,002,841 | 1/1977 | Ching et al. | 370/81 |
| 4,048,447 | 9/1977 | Maruta | 370/81 |
| 4,571,736 | 2/1986 | Agrawal et al. | 375/27 |
| 4,589,130 | 5/1986 | Galand | 370/81 |
| 4,630,261 | 12/1986 | Irvin | 370/81 |

OTHER PUBLICATIONS

"The Realization of a TDMA/DSI Terrestrial Interface Module Using Distributed Processing Techniques" by M. B. Saunders et al., Conference: Fourth International Conference on Digital Satellite Communications, Montreal, Canada (23–25, Oct. 1978).

"Performance of an ADPCM/TASI System" by Townes et al., in International Conference on Communications, Seattle, Wash. U.S.A. (8–12 Jun. 1980) pp. 42.6.1 to 42.6.5.

"Design and Performance of a DSI Terminal for Domestic Applications" by Maruta et al. in IEEE Transactions on Communications, vol. COM-29, No. 3, Mar. 1981, pp. 337–345.

*Primary Examiner*—Douglas W. Olms
*Assistant Examiner*—Alpus H. Hsu
*Attorney, Agent, or Firm*—Sughrue, Mion, Zinn, Macpeak & Seas

[57] ABSTRACT

A low-rate encoding/digital speech interpolation (LRE/DSI) system architecture is organized to eliminate the LRE mistracking problem normally associated with DSI-induced speech clipping, to reduce the number of LRE codes required and to provide a mechanism for gradually introducing overload.

22 Claims, 6 Drawing Sheets

FIG. 1 LRE/DSI ENCODER (PRIOR ART)

TC TERRESTRIAL CHANNEL
IC INTERNATIONAL CHANNEL
SC SATELLITE CHANNEL
AC ASSIGNMENT CHANNEL
LRE LOW-RATE ENCODING

DATA DETECTOR

THE EFFECT OF VARIABLE DELAY ON CLIP PROBABILITY

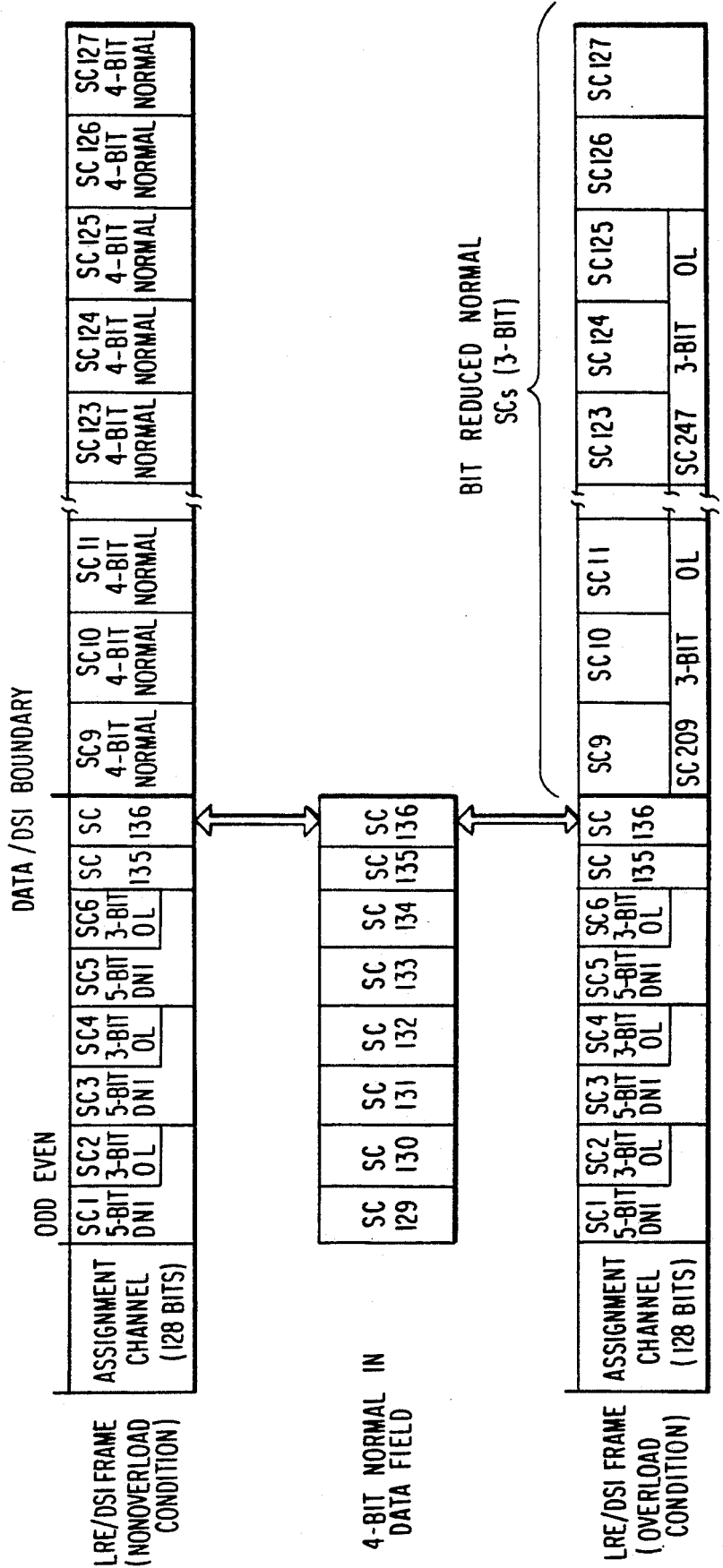
FIG. 5  LRE/DSI FRAME

LRE/DSI DECODER

LOW-RATE ENCODING/DIGITAL SPEECH INTERPOLATION SYSTEM

This is a continuation of application Ser. No. 06/748,385 filed Jun. 25, 1985, now abandoned.

BACKGROUND OF THE INVENTION

1. Field of the Invention

The invention relates to a speech and data communication system which is usable on undersea, terrestrial and satellite communication links. More specifically, the invention relates to low-rate encoding (LRE), digital speech interpolation (DSI) system architecture.

2. Description of the Prior Art

In the prior art, the LRE encoders were introduced into the DSI system as shown in FIG. 1. In this configuration, one LRE encoder is required for each input channel. The outputs of the LRE encoders are routed under control of the DSI assignment processor to the appropriate memory locations in the DSI output buffers. If the number of active input channels to be served exceeds the available number of long-distance transmission channels, including overload channels, then the outputs from some of the LRE encoders will be lost and a speech clip will occur. The expression "speech clip" refers to the situation where the leading edge of speech is lost. Since the LRE encoder continues to receive an input signal under this condition, its adaptive quantizer and adaptive predictor section continue to track the input signal. The occurrence of a speech clip prevents transmission of the LRE encoder output to the corresponding LRE decoder at the receiver unit. Consequently, the LRE decoder is unable to adapt its quantizer and predictor sections to match the actions in the LRE encoder. Since this loss of information can be substantial, long-lasting mistracking problems can arise in the LRE decoder causing significant distortion. In order to overcome these problems, the dissipation factor normally used to overcome the effects of bit errors must be substantially increased. This would in turn reduce the unimpaired performance of the LRE codec.

In the prior art when the DSI load increases to the point where overload capacity is required, all LRE codecs are forced to operate in their 3-bit/sample mode. The operating mode of all LRE codecs must be changed together in order to avoid problems associated with selectively modifying the operating mode of a distributed set of LRE codecs for purposes of overload channel formation. Although changing the LRE codecs to their overload mode en masse requires only a single control line from the DSI assignment processor, it has the undesirable effect of causing the entire system to go into overload when only a single overload channel is required.

SUMMARY OF THE INVENTION

The present invention relates to a way of organizing the sequence of internal processing in an LRE/DSI system which offers three major improvements over the prior art. First, the invention includes a solution to the problem encountered in conventional LRE/DSI systems where freezeout causes the LRE encoder and decoder to mistrack. Second, the invention includes a method for substantially reducing the hardware associated with encoding the input signals to the DSI system into the LRE format for "point to point" operation by reducing the number of LRE encoders and LRE decoders required. For "point to multipoint" operation, however, an LRE decoder is required for each channel. Third, the invention allows overload channel processing, and the associated channel degradation, to be invoked gradually. The third improvement applies to a bounded subset of overload channels whose number depends on the number of 5-bit data channels or the location of boundary x, i.e., the data/DSI boundary.

According to the present invention, it is not necessary to have an LRE encoder for each input channel to be served. In a given system containing "N" normal transmission channels in which "b" overload channels may be created, transmission is restricted to "N+b" input channels. Therefore, only "N+b" LRE encoders are required to accommodate these input channels. By locating the LRE encoders such that only the signals which are actually transmitted are encoded, then when speech clipping occurs the loss of information is moved from the LRE encoder output to the LRE encoder input. When a speech clip occurs, no LRE encoded information is lost, and the LRE encoder and LRE decoder will track properly by faithfully transmitting the speech clip. Under this condition, the dissipation factor in the LRE codec can be returned to its normal value, and a high level of LRE codec performance can be realized all the time. Speech clipping no longer causes a problem in LRE codecs which utilize memory elements.

When the DSI load increases to the point where overload capacity is required, a special class of overload channels is individually selected and exhausted before the entire system is forced into overload operation. These special overload channels are available as a consequence of the unique LRE/DSI frame format and the utilization of 5-bit/sample data channels. The special class of overload channels are individually formed from the three residual bits which remain after the creation of a 5-bit/sample data channel.

It is an object of the invention to implement an LRE/DSI system having the above characteristics around a basic LRE/DSI functional block in which the number of LRE codecs is minimized and essential DSI features are provided.

It is a further object of the invention to use a modular approach to hardware implementation allowing the basic LRE/DSI system to be augmented with additional features which provide various levels of enhanced performance as set forth below in Table 1.

TABLE 1

1. 240 input channel capacity
2. A maximum of 166 LRE encoders and 240 LRE decoders per terminal
3. ADPCM flexibility:
   a. Full CCITT compatibility
   b. 3-, 4-, and 5-bit/sample quantizer capabilities, while maintaining other CCITT features
4. No degradation due to coder memory
5. a. Highly reliable speech/data discrimination
   b. Capability of transmitting VF data signals up to 9.6 kbits/s
6. System options which allow for operational flexibility with the following features:
   a. Basic 4-bit sample codec only without overload
   b. Overload to be shared by all channels operating at 3-bits/sample
   c. Limited but gradual overload introduction
   d. Voice frequency (VF) data detection and reassignment to capacity designated for VF data transmission.

TABLE 1-continued e. VF data detection and assignment to a 5-bit/sample quantizer
  f. Variable delay having selectable length up to 320 ms
  g. Herding under software control
  h. Built-in speech activity applicable to simulate a 240-channel system
 7. Direct interface with the common TDMA terrestrial equipment (CTTE) of the TDMA system

BRIEF DESCRIPTION OF THE DRAWING

The foregoing and other objects, features and advantages of the present invention will become apparent from the following more detailed description of a preferred embodiment of the invention with reference to the accompanying Drawing in which:

FIG. 5 shows an illustrative LRE/DSI frame.

DESCRIPTION OF THE PREFERRED EMBODIMENT(S)

Figure 1:
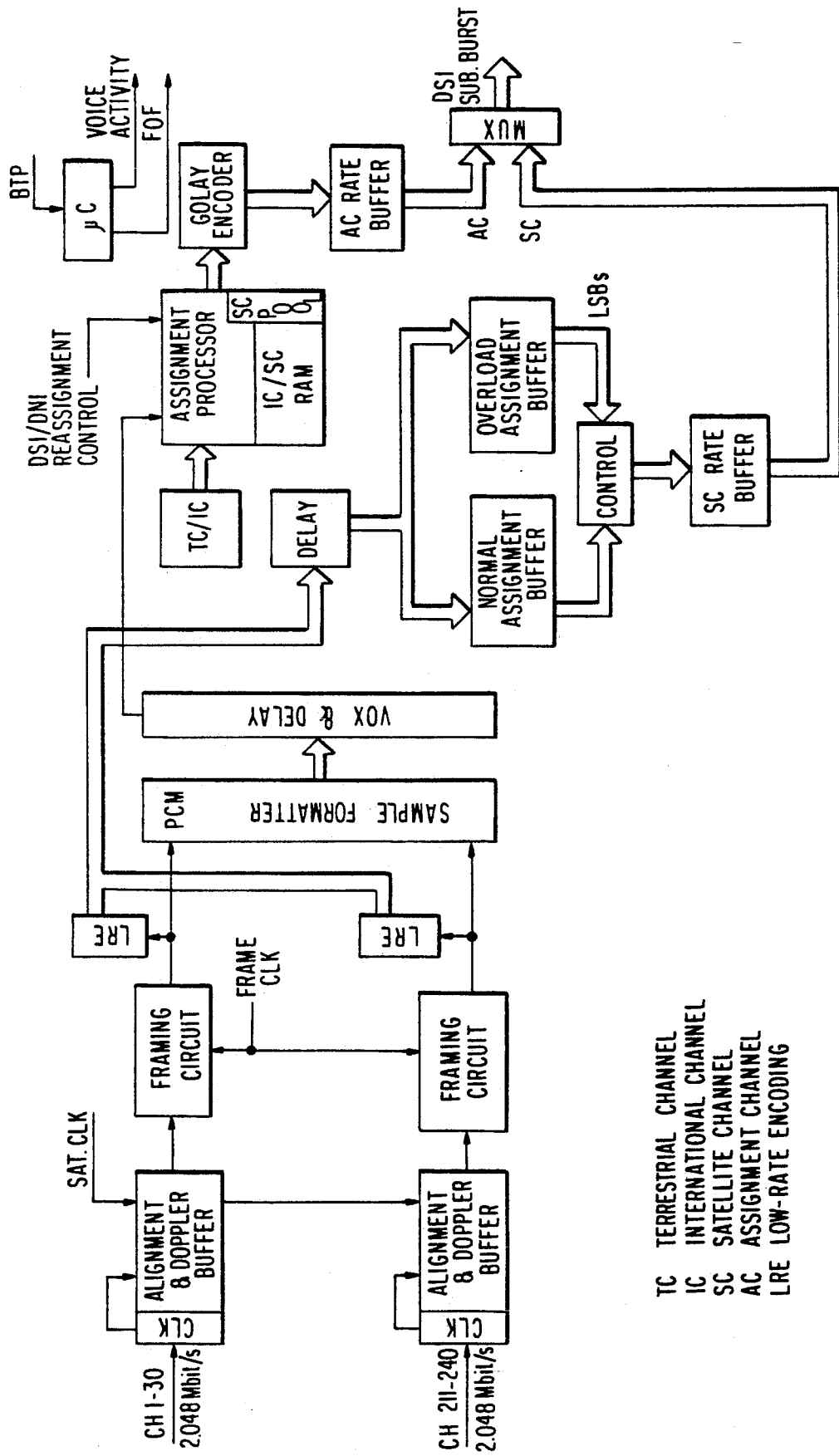
FIG. 1 is a block diagram of a low-rate encoding digital speech interpolation system according to the prior art.

The invention will now be described according to a preferred embodiment with reference to the Drawing. Although the preferred embodiment is described in terms of a satellite communication system, it will be understood by one of ordinary skill in the art that the invention is not limited to such. The invention pertains to transmission systems generally and is only limited in the manner recited in the claims appended hereto and forming part of the present disclosure.

Figure 2:
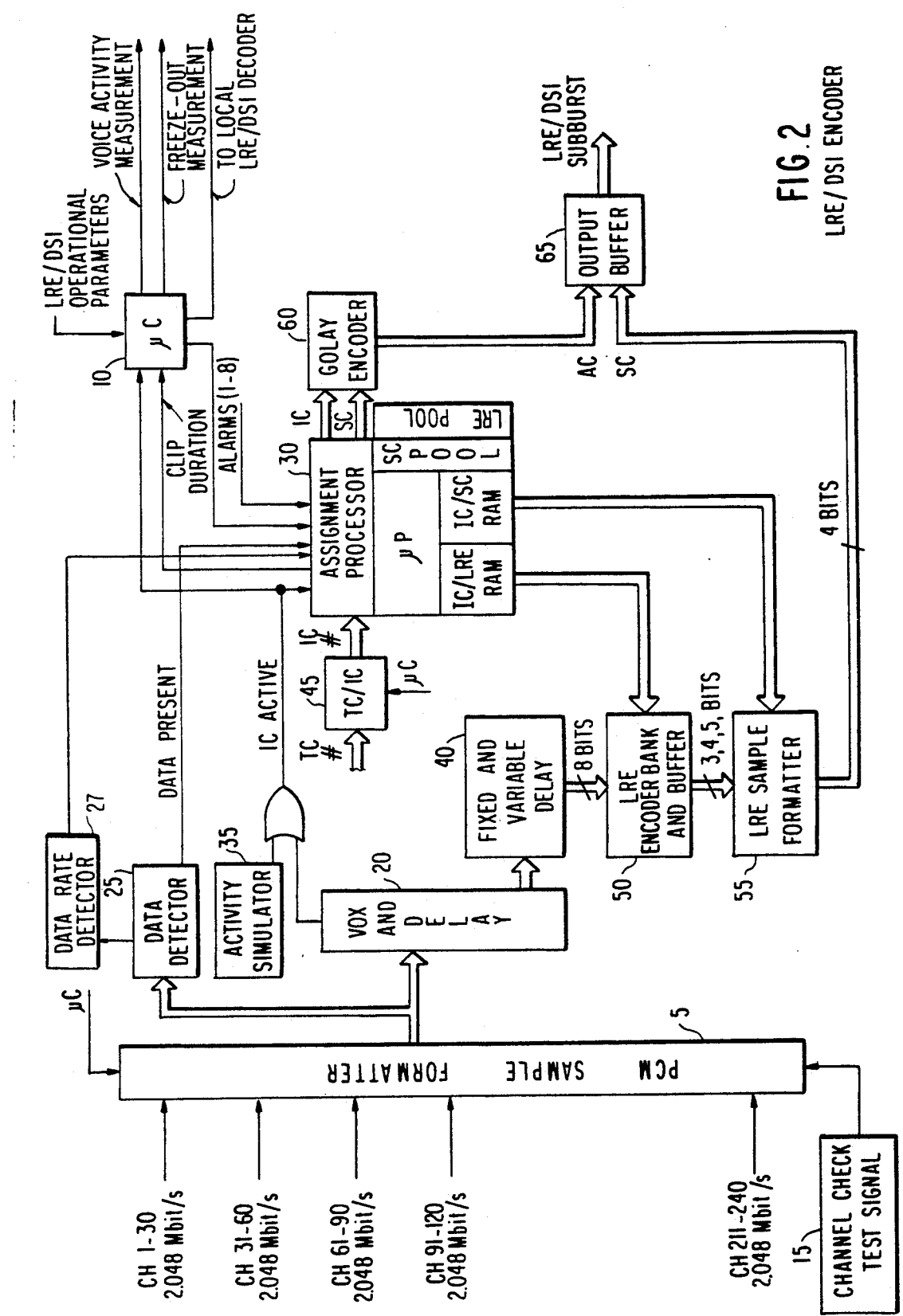
FIG. 2 is a block diagram of a low-rate encoding digital speech interpolation system encoder according to the present invention.

A block diagram implementation of a 32-kbits/s 240-channel LRE/DSI encoder according to the present invention is shown in FIG. 2. The LRE/DSI encoder interfaces synchronously with the terrestrial network through eight 2.048 Mbit/s serial CEPT data streams. The invention is not constrained by the CEPT input format. It would be a simple design modification for one of ordinary skill in the art to accept the T1 format at 1.544 Mbit/s instead of CEPT at 2.048 Mbit/s. The number of channels would be 24(n) for the T1 format and 30(n) for the CEPT format where n is the number of input bit streams. The streams may originate from eight CEPT PCM codecs or from four supergroup transmultiplexers. The LRE/DSI encoder interfaces with the time division multiple access (TDMA) satellite network in a "subburst" format. This interface could also be a continuous serial bit stream and the TDMA could form the subburst format. The subburst interface is accomplished by connecting the LRE/DSI system directly to one of the 32 available digital speech interpolation/digital non-interpolation (DSI/DNI) ports in the common TDMA terminal equipment (CTTE). The CTTE addresses the LRE/DSI system and reads the contents of the LRE/DSI output buffers. The resultant subburst is then stored in the TDMA burst buffer for subsequent transmission. The LRE/DSI system can also be configured to accomodate 120 input PCM channels into the capacity and format of a 2.048 Mbit/s data stream. The 30 8-bit time slots can be preassigned to 30 DNI satellite channels (SCs) in a DSI subburst or to 30 DNI satellite channels in a DNI subburst. The LRE/DSI Assignment Message Channel (AMC) can be carried to the DSI or DNI system in time slot "16" and then preassigned to a DNI satellite channel or the LRE/DSI AMC can be contained within the 30 original DNI satellite channels. This approach forces the DSI gain of the LRE/DSI system to a value which is slightly higher than 2:1, i.e., (120/58:1 or 2.07:1).

A fundamental novelty of the present invention is that n-bit samples are first interpolated and subsequently processed in an adaptive differential pulse code modulated encoder.

Each stage of the LRE/DSI encoder block diagram will now be addressed in detail.

PCM Sample Formatter

The 240 input channels to the LRE/DSI System are derived from eight CEPT PCM serial data streams, each at a rate of 2.048 Mbit/s. These data streams may originate from eight synchronously driven PCM codecs or from four synchronously driven supergroup transmultiplexers. It is noted that the prior art shown in FIG. 1, shows doppler buffers and can accommodate asynchronous inputs. Such devices may also be used with the present invention. The PCM sample formatter 5 converts the 2.048-Mbit/s serial streams to 8-bit parallel samples, discards the synchronization and signaling time slots from the CEPT frame and arranges the samples in ascending order of channel number. The system size is controlled by the micro-computer 10 and can be changed from 0 channels to 240 channels in increments of one channel. A channel check test signal 15 is internally generated in digital for and multiplexed into the 8-bit parallel output of the PCM sample formatter for voice switch detection. This test signal is subjected to the interpolation process at the encoder and monitored for on/off format degradation at the decoder. Since the test signal may experience front-end clipping due to excessive loading and freeze out, the test signal generator and alarm monitor provide a means for detecting such degradation.

Voice Switch and Delay

The accurate detection of speech is critical to the proper operation of the LRE/DSI system. The major function of the voice switch (VOX) 20 is to recognize the presence of speech on clear and noisy channels. It must be capable of discriminating between speech and noise over a wide dynamic range. In order to avoid excessive loading of the DSI system, the voice switch must be immune to false activation on impulse noise; or if falsely activated, it should only remain on for a short period of time. Finally, the VOX must recognize speech quickly in order to avoid front-end clipping of the speech signal. This combination of requirements is optimally accommodated in the LRE/DSI system by incorporating within the VOX a fixed delay to minimize front-end clipping, a floating detection threshold to increase the dynamic range and a variable hangover time to minimize transmission of unwanted noise.

The voice switch also provides a measure of protection against excessive DSI loading which results from false detections on modulated noise signals generated by remotely located echo control unit switching functions. Excessive DSI loading will occur if the adaptive voice switch threshold does not track the modulated noise signal. The effect of the echo control units' action on voice switch performance are minimized by disabling the threshold adaptation process when the echo control units are enabled. This switching action is detected by sensing the presence of speech on the receive side of the DSI system. This control signal, with a hangover time of sufficient duration to match the echo control unit switching hangover time, is used to disable the threshold adaptation process.

Data Detector

The data detector 25 independently monitors each input channel and alerts the assignment processor 30 when data is present on the channel. Upon receiving a data present indication from the data detector 25, the assignment processor 30 automatically switches the LRE codec to 5-bit operation and arranges for the 5-bit samples to be routed to a 5-bit data SC. The input channel remains assigned to that data SC for the duration of the data call. When data is no longer present on the channel, the LRE codec which was carrying the data channel is switched back to 4-bit operation and the channel is reassigned to a normal 4-bit satellite channel. This feature provides a mechanism for passing 4800-bit/s and 9600-bit/s inband data through the LRE/DSI system without degradation.

The data detector 25 uses the amplitude statistics and zero crossings of the input signal to determine whether the signal is speech or data.

Figure 3:
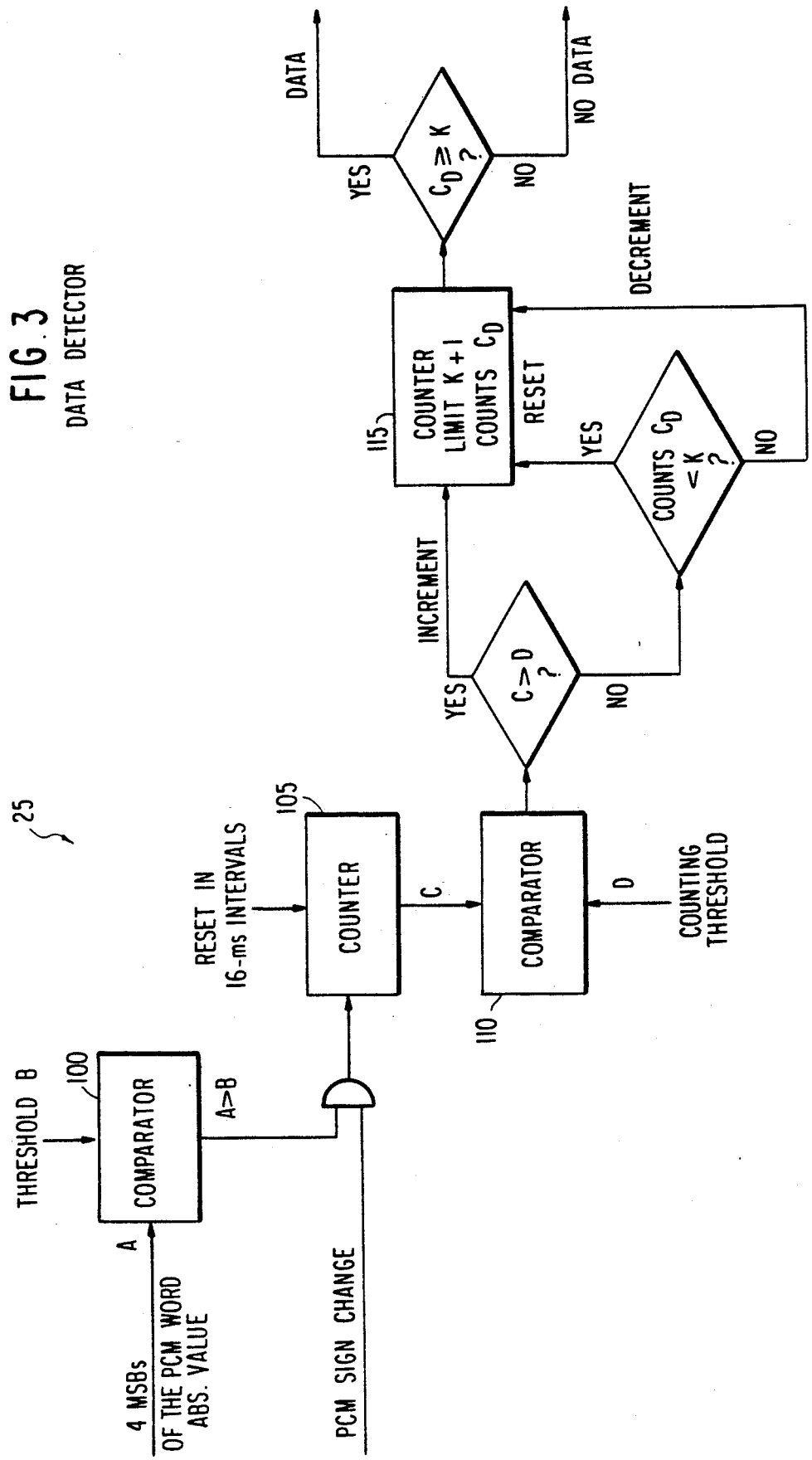
FIG. 3 represents the data detection algorithm included in a 32-kbits/s LRE/DSI system.

FIG. 3 represents the data detection algorithm included in a 32-kbit/s LRE/DSI system. The input sample, at an 8-kHz sampling rate, is an 8-bit PCM word. The four most significant bits (MSBs) of the absolute value A of a PCM word are compared against a threshold B in a comparator 100. If $A>B$ and the sign of present and previous PCM words are different, then counter 105 is incremented by 1. In the preferred embodiment, counter 105 is reset every 16 ms. Content C of counter 105 is compared against a threshold D in comparator 110. If $C>D$, then counter 115 is incremented by 1. Counter 115 counts a maximum of $K+1$, where K is the count required to determine whether a signal is speech or data. If $C \leq D$ and $C_D$ the number of counts or, contents of counter 115, is less than K then counter 115 is reset; otherwise, counter 115 is decremented by 1. Finally, if $C_D$ is equal to or greater than K, then the input signal is considered to be data; otherwise, it is considered to be a non-data signal.

Activity Simulator

Returning to FIG. 2, the activity simulator 35 provides a means of artificially loading the LRE/DSI system so that system performance can be measured for large fully loaded system configurations. Speech activity is simulated independently for a maximum of 240 channels. The simulated system size is controlled by the microcomputer 10 and can be changed from 0 channels to 240 channels in increments of one channel. The simulated channels can be used in conjunction with the actual input channels to provide artificial loading for a set of live test channels. The on/off speech spurt durations are modeled by exponential distributions which reside in ROM and can be changed to suit particular loading requirements. Voice activity measurements are performed by the microcomputer 10.

Delay Circuit

The delay circuit 40 compensates for DSI assignment message connection delay through the use of fixed delay and also postpones the onset of overload channel formation and freeze out through the use of variable delay. The samples of an active input channel enter the variable delay buffer if a satellite channel is not available for transmission. The samples remain in the buffer and continue to be delayed until a normal or overload satellite channel becomes available or until the delay capacity has become exhausted. Normal-derived overload satellite channel capacity will not be requested until the samples have exceeded the maximum delay buffer boundary and have not yet been assigned to a normal satellite channel. Once the samples reach the end of the delay buffer and have not been assigned to a satellite channel, they are no longer retrievable, and speech clipping begins. The capacity of the variable length delay buffer and the maximum delay buffer boundary are independently adjustable with a maximum value of 320 ms.

Figure 4A:
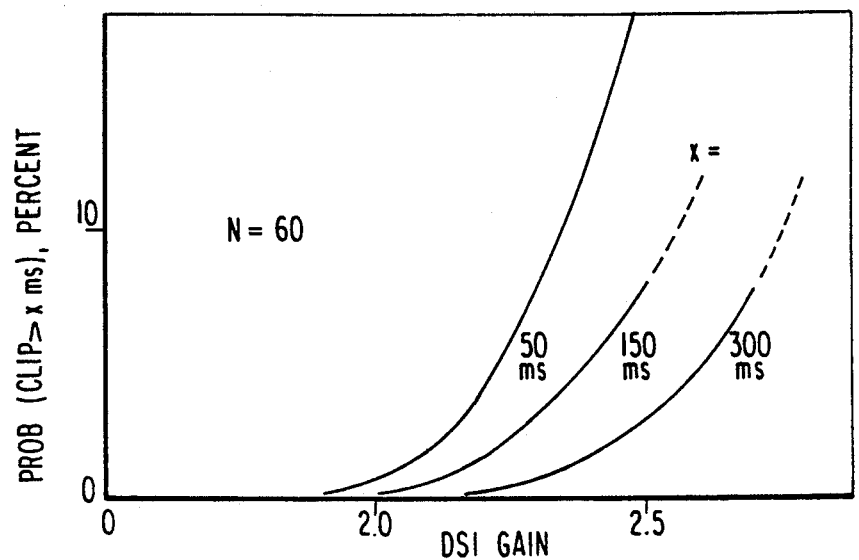
FIGS. 4a through 4c show the effects of variable delay on the probability of clipping for systems of 60, 120 and 240 channels, respectively.
Figure 4B:
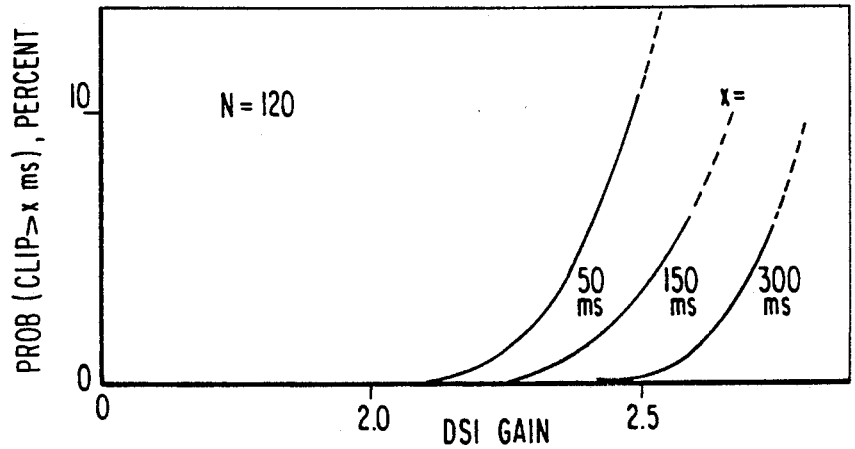
Figure 4C:
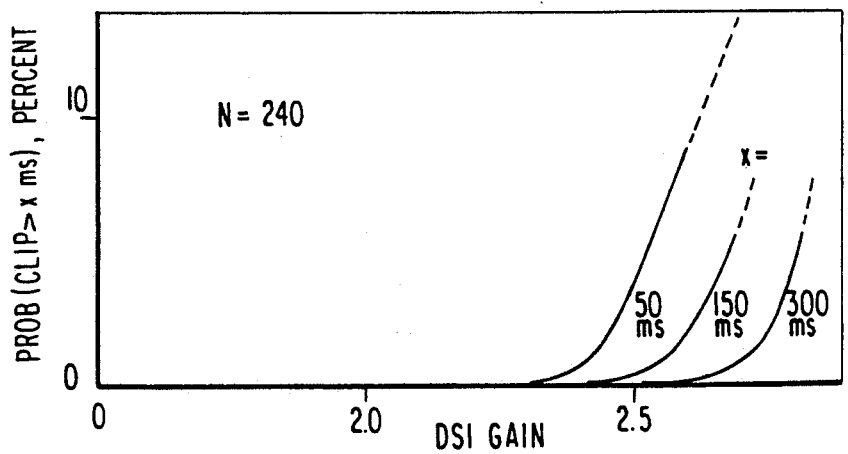

The effects of variable delay on the probability of speech clipping for system sizes of 60, 120 and 240 channels is shown in FIGS. 4a, 4b and 4c, respectively.

TC/IC Translator

Each terrestrial channel (TC) is identified by a number (address) and translated by a programmable RAM into a corresponding international channel number (IC), which is similarly identified by the TC/IC translator 45. The IC number, together with the VOX output line (IC active) are provided as inputs to the assignment processor. The TC/IC translator is programmed via the resident microcomputer 10.

Assignment Processor

The assignment processor 30 comprises four main sections, namely: a microprocessor, a memory section for storing the satellite channel (SC) pool and the LRE pool; an IC/LRE mapping RAM and an IC/SC mapping RAM. The assignment processor monitors the voice switch activity line and various attribute registers for each channel and uses this information to route each IC channel number into either a new assignment, reassignment (normal/overload/data) or disconnect queue. The pool of available satellite channels is then searched until three normal SCs, three data-derived 4-bit normal SCs, three normal-derived overload SCs, three data derived overload SCs, or three 5-bit data SCs have been found. Each of these SC types may not be searched for if the system configuration does not require its use. The pool of available LRE encoders is also searched until 3 LRE encoders have been found. Once the SCs and LREs have been identified, three IC numbers are read from the queues and assigned to the appropriate LRE encoder and SC type. The queues are read in order of priority from new assignments to reassignments to disconnects. The assignment processor updates the IC/LRE and IC/SC mapping RAMS with each IC/LRE and IC/SC relationship and also generates a corresponding assignment message.

The assignment processor is realized by using a combination of hardware and software. High speed hardware is necessary to search the SC pool for available SCs and LREs and a microprocessor is used to assign available SCs and LREs to active ICs and to update the IC/LRE RAM, the IC/SC RAM, and other status registers. When an IC becomes inactive, the microprocessor locates the SC and LRE encoder assigned to them and returns them to their respective pools so that other ICs may use them.

The pool of available 4-bit normal, 3-bit normal-derived overload, 4-bit data-derived normal, 3-bit data-derived overload and 5-bit data SCs and the pool of LRE encoders are each independently variable in increments of one.

When the pool of available 4-bit normal, 4-bit data-derived normal and 3-bit data-derived overload SCs have been exhausted and the samples have exceeded the maximum delay buffer boundary, the assignment processor must search the pool of available normal-derived overload SCs. Once an available overload SC has been found, the assignment processor directs the overload LRE encoder and all normal LRE encoders used to form overload channels to switch to their 3-bit encoded output. The 3-bit output from the overload LRE encoder is multiplexed into the least significant bit (LSB) positions of 3 contiguous normal SCs. If an IC has been assigned to an overload SC, the assignment processor queues the IC for reassignment from the overload SC to a normal SC and then executes the reassignment when a normal SC becomes available. The final overload to normal reassignment or overload disconnect message signals all normal LRE codecs in the encoder and decoder to revert back to their standard 4-bit mode of operation. During a reassignment process, the IC/LRE relationship is maintained and only the IC/SC relationship is changed.

The assignment processor in the prior art devices always attempts to assign an active IC to its previously assigned SC and LRE. This protocol results in new assignment messages being generated only when a previously established IC/SC or IC/LRE relationship is no longer valid. This procedure provides for more efficient use of the assignment channel but makes subburst length reductions during lightly loaded periods cumbersome, since reassignments from higher numbered SCs into lower numbered SCs must be done manually.

This assignment protocol has been utilized but the limitation has been eliminated with the preferred embodiment of the LRE/DSI terminal. The process of assigning active ICs to the lowest available SC number has been termed "herding" and has the effect of concentrating the traffic at the beginning of the LRE/DSI subburst. This feature is particularly attractive when the LRE/DSI system interfaces directly to the CTTE. Active ICs can be automatically "herded" to the beginning of the subburst when burst time plan changes require a reduction in the length of the LRE/DSI subburst.

In addition, the assignment processor 30 monitors the "data present" line from the data detector 25. When the detector indicates that data is present, the assignment processor reassigns the data signal from the 4-bit normal SC to a 5-bit data SC for the duration of the data call and then reassigns the input channel back to a 4-bit normal SC when data is no longer present on the channel.

A data rate detector 27 may be used in addition to the encoder data detector to determine the bit rate of the in-band data. The data rate detector detects and classifies the data rate into one of three categories according to a preset threshold, e.g., 4800 bits/s. The data rate is classified as being (i) less than 4800 bits; (ii) equal to 4800 bits/s; or, (iii) greater than 4800 bits/s. If the in-band data is recognized as being greater than a preset threshold, then i.e., (i) greater than 4800 bits; or (ii) equal to or greater than 4800 bits, the signal will continue to be transmitted using a 5-bit data SC but if the in-band data rate is below the threshold, the data channel will be reassigned to a 4-bit data SC for the duration of the data call.

Microcomputer

The LRE/DSI system is configured and controlled through a peripheral CRT terminal and a resident microcomputer 10. System size, TC/IC relationships, IC/SC preassignments and receive subburst identification are entered into the LRE/DSI system through the microcomputer. The microcomputer monitors the ensemble speech activity and the freeze-out fraction and calculates a one-minute average for each of these parameters. A form of dynamic load control is generated by monitoring a control line from the variable delay buffer which is set to a logic "1" when the maximum delay buffer boundary is exceeded.

IC/LRE RAM

The IC/LRE mapping RAM in the assignment processor 30 is used to steer the PCM samples associated with an assigned IC to a designated LRE encoder. Since each LRE encoder may operate in a 3-bit, 4-bit or 5-bit per sample mode, the IC/LRE RAM must also configure the selected LRE encoder to operate with the proper number of bits per sample. The IC/LRE RAM is dynamically updated by the assignment processor.

LRE Encoder Bank and Buffer

In a 240/120 DSI system, the LRE encoder bank and buffer 50 consists of a maximum of 166 ADPCM processors each of which can operate in a 3-bit, 4-bit or 5-bit per sample mode. The mode of operation is specified by the IC/LRE RAM which directs the 8-bit PCM samples to the input of the specified ADPCM encoder. Each PCM sample is processed by the encoder and results in a 3-bit, 4-bit or 5-bit ADPCM sample being latched at the output of the encoder. The 16 ADPCM samples which are generated by each of the 166 ADPCM processors during the 2-ms frame period are stored in buffer memory for subsequent routing and formatting.

IC/SC RAM and LRE Sample Formatter

The IC/SC RAM in the assignment processor 30 and the LRE sample formatter 55 are used to read the contents of the LRE encoder/buffer memory and to format the samples into the LRE/DSI frame as shown in FIG. 5. The IC/SC RAM is dynamically updated by the assignment processor. The LRE samples are read in satellite channel pairs from the LRE encoder/buffer to form an 8-bit word. This scheme allows the 5-bit data SCs to be formatted with the remaining adjacent 3-bit data-derived overload SCs and also arranges the satellite channels into a form suitable for the output buffer 65. The LRE samples in the 3-bit normal-derived overload satellite channels are multiplexed into the LSB positions of the bit reduced normal satellite channels. The two LSBs for two adjacent 4-bit normal satellite channels are located at bit positions 0 and 4 in the 8-bit word.

A data/DSI boundary exists in the LRE/DSI frame, (as shown in FIG. 5), which segments the frame into a data section which is reserved primarily for 4-bit and 5-bit data SCs and a DSI section which is reserved primarily for 4-bit normal SCs. The data section has 3-bit data-derived load SCs which are available from the balance of the two 4-bit data-derived normal SCs used to form a 5-bit data SC. These data-derived overload SCs are used before the normal-derived overload SCs since they can be individually selected and do not force all of the 4-bit normal SCs into a 3-bit mode of operation. This approach results in a more gradual system degradation when an overload condition occurs. The data section also has 4-bit data-derived normal SC capabilities. These data/voice SCs are used when all of the 4-bit normal SCs in the DSI section are occupied and not all of the 5-bit data capacity is in use.

The DSI section accommodates 4-bit normal SCs and 3-bit normal-derived overload SCs. The normal-derived overload SCs are formed by reducing the bit rate of all normal SCs from 4-bit to 3-bit and multiplexing a 3-bit overload SC into the least significant bits of three contiguous normal SCs.

The basic features of this frame structure involve the use of sets of SC pools. These sets are listed below in their order of priority, where normal speech channels are given to priority in the speech area and data channels top priority in the data area.

a. Normal satellite channels carrying 4-bit speech.

b. Data channels where the encoding is increased from 4-bits to 5-bits. One data channel will, therefore, require the use of two normal satellite channels with 3 bits left over.

c. Data/voice channels carrying 4-bit encoded speech in the area assigned to data when these channels are unoccupied and all normal satellite channels are occupied.

d. Data-derived overload channels that are created from the leftover 3-bits which remain when a 5-bit data channel is in use.

e. Normal-derived overload channels that are created by reducing the encoding rate from 4-bits to 3-bits. When one of these overload channels is needed, all the normal satellite channels will be reduced from 4-bits to 3-bits.

The following a priori satellite channel assignments are used to identify the various classes of satellite channels. Consider the case of a 240/127 system and let SC numbered "x" be the last satellite channel in the data priority section of the LRE/DSI frame. The following information is summarized in Table 2.

Normal satellite channels carrying 4-bit speech are now identified by SC numbers greater than x and $\leq 127$.

Since two satellite channels are required to carry 5-bit data and only one assignment message is transmitted, the SC numbers $\leq x$ take on special meanings. Odd numbered SCs less than x indicate that 5-bit data is being transmitted while even numbered SCs less than and/or equal to x indicate that a 3-bit data-derived overload channel is being transmitted in the leftover bits of the even numbered SC.

Eight SC numbers are reserved for use in transmitting channel check error messages. These numbers are 128 and 249 through 255.

Identification of normal 4-bit speech channels in the data area is accomplished by assigning SC numbers that are equal to the original SC number plus 128. Thus, if it is less than x, SC 1 becomes SC 129 when it carries 4-bit speech. Similarly, SC 2 becomes SC 130 etc., up to SC (x+128) for $x \leq 80$. These relationships remain fixed and independent of system size.

Overload channels that are derived from normal satellite channels are identified by SC numbers ranging from 209 to 247. Their association with normal SC numbers are fixed independent of system size. For example, if SC 247 is derived from SCs 123, 124, and 125, then if SCs 123, 124, and 125 are not used in a small system, then neither will SC 247 be used.

If a maximum of 39 normal-derived overload channels are used, then SC numbers 129 through 208 are available to identify 4-bit voice channels in the region x. This would permit SC $x_{max}$ to be 80 and enable 40, 5-bit data channels to be identified while permitting full use of these 80 SCs for 4-bit speech. A consequence of setting x=80 is to prevent the formation of 24 normal-derived overload channels SC numbers 209 through 232 in the region x.

TABLE 2

| Satellite Channel Number Assignments[a] | |
|---|---|
| Odd SC Numbers < x | Designate 5-bit data channels |
| Even SC numbers $\leq$ x | Designate 3-bit data-derived overload channels |
| x < SC number $\leq$ 127 | Designate normal 4-bit channels |
| SC number 128 | Reserved for channel check error message, i.e., an internal monitor which continuously checks for the channel continuity. |
| 129 $\leq$ SC number $\leq$ 208 | Designate channels carrying 4-bit speech in a designated data area |
| 209[b] $\leq$ SC numbers $\leq$ 247[c] | Designate 3-bit overload channels derived from normal 4-bit speech channels |
| SC number 248 | Reserved for a special overload signalling message |
| 249 $\leq$ SC numbers $\leq$ 255 | Reserved for channel check error message |

[a]Let x be an even SC number equal to the highest satellite channel designated for carrying 5-bit data plus one.
[b]This boundary is a computed boundary based upon input definition of the number of data channels and overload channels desired.
[c]The information in this table is based upon the assumption that the maximum number of overload channels in this category will be 39.

Golay Encoder

The new assignment, reassignment, disconnect and refresh messages from the assignment processor are processed by the Golay encoder 60 and are transmitted to the LRE/DSI decoder through the assignment message channel. In the preferred embodiment, the assignment message channel has the capacity to transmit 3 rate ½ Golay encoded assignment messages every 2 ms.

Output Buffer

The output buffer 65 multiplexes the assignment message channel and the SC samples into an LRE/DSI subburst format and provides an interface between the LRE/DSI subburst output and the transmission facility. When interfacing to a TDMA satellite network, the CTTE addresses the LRE/DSI system and reads the contents of the LRE/DSI output buffers. The resultant subburst is then multiplexed into the TDMA burst. Other interface requirements can be satisfied by tailoring the design of the output buffer to the specific interface.

LRE/DSI Decoder

Figure 6:
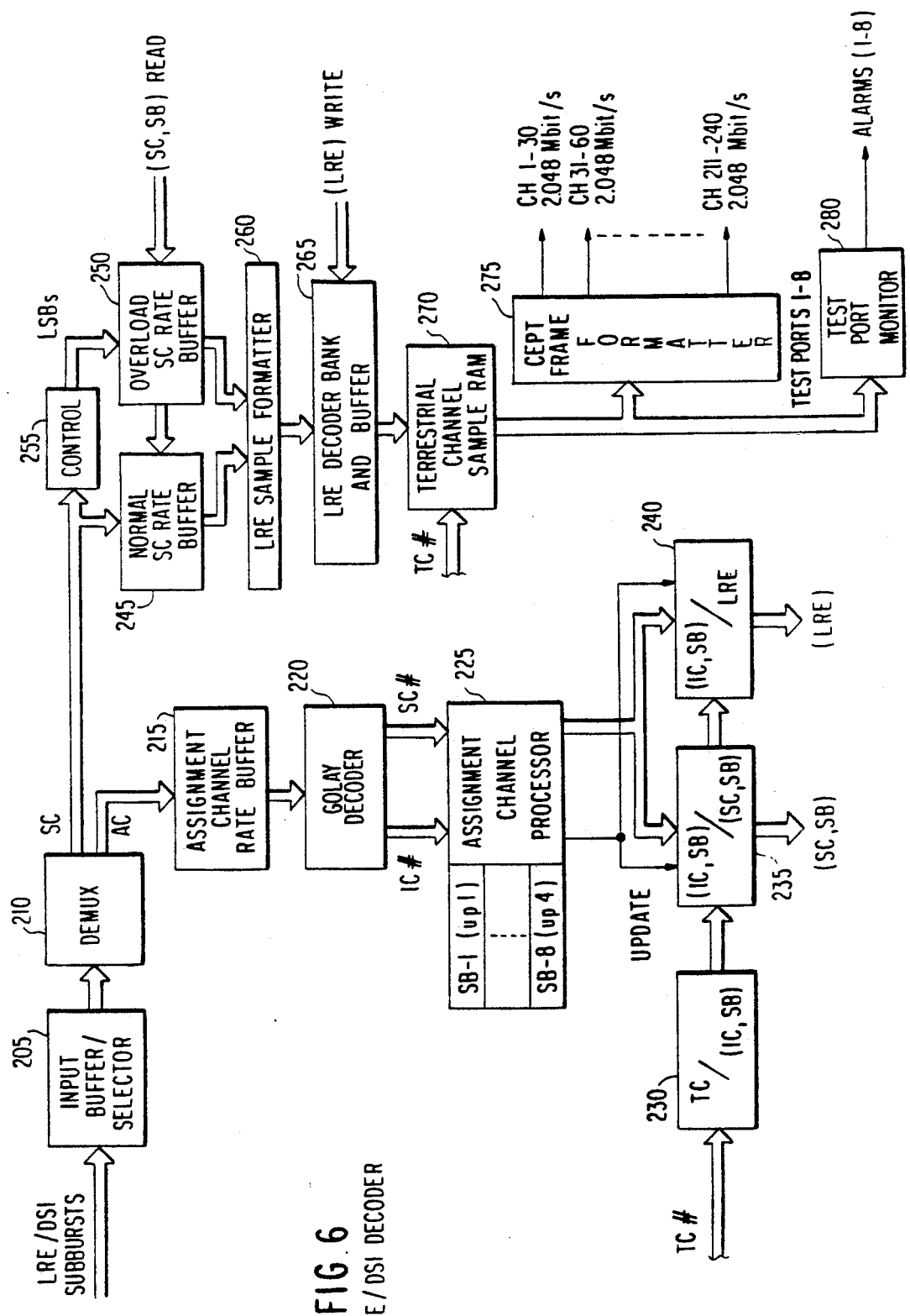
FIG. 6 is a block diagram of a low-rate encoding digital speech interpolation system decoder according to the present invention.

A block diagram of the 240 channel LRE/DSI decoder is shown in FIG. 6. The LRE/DSI system is designed to operate in a multi-destinational environment and can process up to eight LRE/DSI subbursts.

Input Buffer/Selector and DEMUX

The input buffer/selector 205 provides an interface between the transmission facility and the LRE/DSI decoder. Many interface configurations are possible, as was described for the encoder output buffer. If the LRE/DSI decoder interfaces directly to a CTTE output port then the 32 possible subbursts present at the output port must be prescreened before entering the LRE/DSI decoder. Only the eight subbursts destined for reception at this LRE/DSI decoder will pass through the subburst selector and be processed. Regardless of the specific interface configuration, the input buffer must demultiplex the assignment message channels and the satellite channels from the data stream and route them to their appropriate destinations. DEMUX 210 performs the demultiplexing function.

Assignment Channel Rate Buffer

The assignment channel (AC) rate buffer 215 stores the eight received assignment message channels and arranges them into a form suitable for the Golay decoder 220.

Golay Decoder

The Golay decoder 220 corrects a limited number of bit errors which may have occurred in each of the eight received assignment message channels during transmission. After the assignment message channels have been processed through the Golay decoder, the 24 resulting assignment messages are routed to the assignment channel processor 225.

Assignment Channel Processor

The assignment channel processor 225 is implemented through a combination of hardware and software. High-speed hardware is necessary to screen the incoming IC and SC numbers, which are contained in the assignment message channel for new assignment, reassignment, implied disconnect, and disconnect messages. A single microprocessor is used to update the (IC,SB)/(SC,SB) RAM 235, (SB=subburst) the (IC,SB)/LRE RAM 240 and various status registers for every two received subbursts. The IC and subburst numbers designated for reception at this decoder are loaded into the LRE/DSI decoder from the microcomputer. In addition, the microcompute loads the decoder with the TC/(IC,SB) map and any (IC,SB)/(SC,SB), (IC,SB)/LRE preassignment information.

TC/(IC,SB) Translator

Each TC number is translated by a programmable RAM 230 into a corresponding (IC,SB) number. The SB number is included in the translation so that any ambiguities may be resolved when IC numbers are repeated in a multidestinational configuration. The (IC,SB) number corresponding to each TC is used as an address to the (IC,SB)/(SC,SB) mapping RAM. The TC/(IC,SB) translator is used in conjunction with the (IC,SB)/(SC,SB) mapping RAM to read samples from the normal SC rate buffer 245 and the overload SC rate buffer 250 and route them to the LRE decoder specified by the (IC,SB)/LRE map 240. The rate buffers have the capacity to hold the samples from eight complete subbursts so the SB number must be used when reading specific SC locations in the rate buffers. The TC/(IC,SB) translator 230 is loaded by the resident microcomputer.

(IC,SB)/(SC,SB) Mapping RAM

The (IC,SB)/(SC,SB) mapping RAM 235 points to a specific (SC,SB) location in the normal SC and overload SC rate buffers for each (IC,SB) number. Samples must be located in the rate buffers for each (IC,SB) channel designation and then routed to a specific LRE decoder for conversion back to 8-bit, A-Law PCM.

The (IC,SB)/(SC,SB) mapping RAM is dynamically updated by the decoder assignment processors under the direction of the received assignment messages.

(IC,SB)/LRE Mapping RAM

The (IC,SB)/LRE mapping RAM 240 directs the samples which are read from the normal SC and overload SC rate buffers to a specific LRE decoder. The (IC,SB)/LRE mapping RAM is dynamically updated by the decoder assignment processors.

Normal SC Rate Buffer

The normal SC rate buffer 245 stores the LRE SC samples from the eight received subbursts which pass through the subburst selector. This buffer is segmented into eight subburst cells, each of which is subdivided into 127 LRE SC locations. Each LRE SC location holds the 16 LRE samples for the 2-ms frame period.

Overload SC Rate Buffer

The overload SC rate buffer 160 stores the LSBs from each LRE SC contained in each of the eight received subbursts. The LSBs are routed to the overload SC rate buffer by the control function circuit 255. The LSBs are stored in memory, regardless if they are needed, so that they will be available for routing to an LRE decoder when the system operates in an overload condition.

LRE Sample Formatter

The LRE sample formatter 260 routes the 3-bit, 4-bit or 5-bit samples from the normal or overload SC rate buffers to the LRE decoder specified by the (IC,SB)/LRE mapping RAM 240. Since the LRE samples may be carried in a 4-bit normal LRE SC, a 3-bit normal-derived overload SC, a 3-bit data-derived overload SC, a 4-bit data-derived normal SC, or a 5-bit data SC, the LRE sample formatter 240 must format the samples from the rate buffer 245 or 250 and route them to the appropriate LRE decoder.

When the normal SC rate buffer is read at a specific (SC,SB) location, the contents of the (SC,SB) location and the contents of the (SC+1, SB) location are made available to the LRE sample formatter. This scheme allows 3-bit data-derived overload samples, 4-bit normal samples, 4-bit data-derived normal samples and 5-bit data samples to be routed to the LRE decoders on a single 8-bit data bus. The sample formatter uses the (SC,SB) number to determine if a 3-bit data-derived overload sample, a 4-bit normal sample, a 4-bit data-derived normal sample, or a 5-bit data sample is to be drawn from the contents of locations (SC,SB) and (SC+1, SB).

When the (IC,SB)/(SC,SB) RAM points to an overload SC, the contents of the specified overload SC are read from the overload SC rate buffer and presented to the sample formatter. The sample formatter arranges the data into a 3-bit normal-derived overload sample which is routed over the 8-bit data bus to the appropriate LRE decoder.

LRE Decoder Bank and Buffer

Once the LRE samples have been routed to the LRE decoder bank and buffer memory 265, they are converted back to 8-bit, A-Law PCM samples and stored in buffer memory. Since each of the LRE decoders contained within the LRE decoder bank may operate in a 3-bit, 4-bit or 5-bit mode, the operating mode for each LRE decoder must be specified by the assignment processor when the (IC,SB)/LRE mapping RAM 240 is updated.

Terrestrial Channel Sample RAM

The terrestrial channel sample RAM (TCSR) 270 stores the 16 converted PCM samples for each of the 240 output TCs. The samples are read from the LRE decoders and routed to a channel storage location in the TCSR. The exact channel storage location is specified by the original TC number which was used in addressing the TC/(IC,SB) map 230 which in turn addressed the (IC,SB)/(SC,SB) map 235 and the (IC,SB)/LRE map 240. The (IC,SB)/LRE map 240 directed LRE samples from the rate buffers to an LRE decoder which in turn converted the LRE samples to A-Law PCM samples. Therefore, since the TCSR is addressed by the ascending TC numbers, the converted PCM sample at the LRE decoder output can be written directly into the TCSR for each TC number.

CEPT Frame Formatter

The CEPT frame formatter 275 converts the 8-bit, A-Law PCM samples from 8-bit parallel to serial, arranges the 240 channels in 30-channel groups, and inserts an alternating synchronization word in TS "0" and a dummy signaling word in TS "16". Each of the eight resultant 2.048 Mbit/s serial outputs are in standard CEPT format and are bit and frame synchronous with the LRE/DSI decoder.

Test Port Monitor

The test port monitor 280 measures the on/off durations of the channel check test tones originating from the eight corresponding LRE/DSI encoders and compares the durations with fixed standards. If the on/off durations fall outside of acceptable standards, then the LRE/DSI decoder signals the local LRE/DSI encoder that an alarm condition exists, and the local LRE/DSI encoder sends an alarm message back to the originating LRE/DSI encoder in the assignment message channel.

While a preferred embodiment of the present invention has been shown and described, it will be understood by those skilled in the art that the foregoing and other changes in form and detail may be made therein without deporting from the spirit and scope of the invention which is limited only by the terms of the appended claims.

We claim:

1. In a speech and data information low-rate encoded, digital speech interpolation communication system, an encoder comprising:

a) means for converting a plurality of serial data streams which are carrying a plurality of active input channels to n-bit samples wherein samples from each input channel are identified by an input channel number;
 b) means for translating each of said input channels to an international channel wherein each international channel is identified by an international channel number;
 c) means for determining whether said n-bit samples contain speech or data information;
 d) means for delaying said n-bit samples;
 e) means for searching a pool of available speech and data transmission channels, said pool consisting of a plurality of transmission channels capable of carrying $(n-k)$-, $(n-l)$- and $(n-m)$-bits per sample corresponding to data, speech and overload channels, respectively, wherein said transmission channels are identified by transmission channel numbers;
 f) means for routing each of said international channels to a selected one of said transmission channels into either (1) its presently assigned transmission channel if it is presently assigned to a transmission channel, (2) a newly assigned transmission channel if it is not presently assigned to a transmission channel, (3) a reassigned transmission channel or (4) into a disconnect mode and generating "refresh", "new assignment", "reassignment" and "disconnect" messages, respectively;
 g) means for routing said messages into an assignment channel; and
 h) means for steering said n-bit samples associated with its respective international channel to a selected one of a plurality of encoders, said plurality of encoders making up a pool of available coders, said encoders being capable of operating selectively in $(n-k)$-, $(n-l)$- and $(n-m)$-bits per sample modes wherein $(n-k)$-, $(n-l)$- and $(n-m)$-bit samples for the selected coder are directed to said selected speech or data transmission channel;
 i) means for formatting said encoded samples in transmission channel pairs to form an n-bit word;
 j) means for multiplexing said assignment channel and the transmission channels into a low-rate encoded digital speech interpolation output.

2. The encoder of claim 1 wherein said means for determining comprises a voice switch and a data detector.

3. The encoder of claim 2 wherein said voice switch further comprises fixed delay means to minimize front-end clipping.

4. The encoder of claim 2 wherein said voice switch has a detection threshold which floats to increase the dynamic range of said voice switch.

5. The encoder of claim 2 wherein said voice switch has a hangover time which is variable to minimize transmission of unwanted noise.

6. The encoder of claim 1 wherein said means for converting is a pulse code modulated sample formatter.

7. The encoder of claim 2 wherein said data detector further comprises:

a first comparator for receiving a predetermined number of the most significant bits of said n-bit samples and compares the value corresponding to said most significant bits, A, with a first threshold value, B;

means for incrementing the contents of a first counter by one unit if A is greater than B and if the sign of the present and previous values of A has changed;

means for resetting said first counter after a predetermined amount of time has elapsed;

a second comparator for comparing the contents of said first counter, C, with a second threshold value, D;

means for incrementing the contents of a second counter $C_D$ if C is larger than D;

means for resetting said second counter if the contents of said second counter is less than a predetermined count number, K, and C is not greater than D and decrementing by one unit the value of $C_D$ if $C_D$ is greater than K and C is not greater than D;

wherein, if $C_D$ is equal to or greater than K, each of said n-bit samples is determined to contain data; otherwise, it is determined to contain speech.

8. The encoder of claim 1 wherein the means for delaying comprises a fixed delay and a variable delay wherein the fixed delay compensates for digital speech interpolation assignment message connection delay and the variable delay postpones the onset of overload channel formation and freeze out wherein the n-bit samples enter the variable delay if a transmission channel is not immediately available.

9. The encoder of claim 1 wherein said plurality of encoders are adaptive differential pulse code modulated processors and $n=8$, $k=3$, $l=4$ and $m=5$.

10. The encoder of claim 1 wherein the international channels may, under operator control, be routed to said transmission channels having the lowest in order transmission channel numbers to concentrate the traffic at the beginning of said low-rate encoded digital speech interpolation output.

11. The encoder of claim 1 wherein $n=8$, $k=3$, $l=4$, and $m=5$.

12. The encoder of claim 1 further comprising means for switching selected coders to a higher rate of bits per sample when data is detected on the international channel associated with said coder;

means for rerouting the samples on a data transmission channel; and means for automatically switching said coder to its previous rate in the absence of data on the international channel.

13. The encoder of claim 1 further comprising means for requesting routing through a normal derived overload transmission channel if an n-bit sample has been delayed for the duration of the fixed delay and has exceeded a maximum delay buffer boundary because no 4-bit normal, or 4-bit data-derived normal or 3-bit data-derived overload channel is available.

14. The encoder of claim 1 further comprising means for returning a previously routed transmission channel to the pool of available transmission channels when the international channel associated with said transmission channel becomes inactive.

15. In a speech and data information low-rate encoded, digital speech interpolation communication system, a decoder comprising:

a) means for receiving low-rate encoded, digital speech interpolation subbursts and selecting a predetermined number of subbursts destined for reception at said decoder;

b) means for demultiplexing said subburst into assignment channels and transmission channels wherein each assignment channel is identified by an assignment channel number and each transmission channel is identified by a transmission channel number;

c) means for decoding said predetermined number of assignment channels to recover assignment messages defining correspondence between international channel numbers and their related transmission channel numbers;

d) means for translating a terrestrial channel number through a terrestrial channel/international channel, subburst map;

e) means for processing said assignment channel number for at least "new assignment", "reassignment", and "disconnect" messages and generating (1) an international channel, subburst/transmission channel, subburst map and (2) an international channel, subburst/low-rate encoder map;

f) means for alternatively storing low-rate encoded transmission channel samples from the predetermined number of received subbursts in a normal transmission channel rate buffer or in an overload transmission channel rate buffer wherein the overload transmission channel rate buffer stores the least significant bits present on said transmission channels where each transmission channel is assumed to have an (n−1)-bit format;

g) means for reading said buffers with the transmission channel subburst map;

h) means for formatting the output of the normal and overload buffers and providing the output to a respective low-rate decoder specified by the international channel, subburst/low-rate encoder map; and i) means for reading the samples from said respective decoder and routing said samples to the terrestrial channel specified in the terrestrial channel/international channel, subburst map.

16. In a speech and data information low-rate encoded, digital speech interpolation (DSI) communication system, a DSI frame assignment method using a pool of transmission channels carrying (n−1)-, (n−m)- and (n−k)-bit words comprising a DSI frame such that normal speech channels are assigned highest priority in a speech area of the frame carrying (n−1)-bit words and data channels are assigned highest priority in a data area of the frame carrying (n−k)-bit words wherein the transmission channels are assigned according to the following protocol comprising the steps of:

(a) assigning normal speech channels to transmission channels in the speech area of the frame carrying (n−1)-bit words;

(b) assigning data channels to transmission channels in the data area of the frame carrying (n−k)-bit words, said transmission channels being derived from two transmission channels carrying (n−1)-bit words with the result that an (n−m)-bit word transmission channel becomes available for use as a speech channel;

(c) assigning speech channels to (n−1)-bit transmission channels ordinarily used for data channels if said transmission channels are inactive;

(d) assigning a speech channel to an (n−m)-bit transmission channel made available as set forth in step (b) hereinabove; and (e) reducing all transmission channels not assigned in the data area of the message frame to carrying (n−m)-bit words, and assigning all speech channels not assigned in the data area of the DSI frame to said reduced transmission channels.

17. The method of claim 16 wherein k=3, l=4, m=5 and n=8.

18. A speech and data information low-rate encoded, digital speech interpolation (DSI) communication system of the type including means for receiving speech and data information via a plurality of receiving channels and means for transmitting said speech and data information in a frame comprising a plurality of transmission channels identified by transmission channel numbers, said transmission channels including data, speech and overload channels and said frame including a designated data area for data channels and a designated speech area for normal speech channels, said system also including means for generating a channel check error message when an error is detected in one of said transmission channels, said system further characterized in that:
   (a) odd transmission channel numbers less than "x" designate 5-bit data channels, where "x" is an even transmission channel number equal to the highest transmission channel designated for carrying 5-bit data plus one;
   (b) even transmission channel numbers equal to or less than "x" designate 3-bit speech overload channels each associated with one of said 5-bit data channels;
   (c) transmission channel numbers larger than "x" and equal to or less than a number "a" designate normal 4-bit channels where "a" is a transmission channel number equal to the highest transmission channel designated for carrying normal 4-bit channels;
   (d) transmission channel number "a+1" is reserved for a channel check error message;
   (e) transmission channel numbers equal to or greater than "a+2" and less than or equal to "b−1", where "b" is a boundary based upon the number of data channels and overload channels desired, designate channels carrying 4-bit speech in a designated data area;
   (f) transmission channel numbers equal to or greater than "b" and equal to or less than "c", where "c−b+1" is the maximum number of overload channels desired, designate 3-bit overload channels derived from normal 4-bit speech channels; and
   (g) transmission channel numbers equal to or greater than "c+1" and equal to or less than "d", where "d" corresponds to a predetermined number, are reserved for channel check error messages.

19. The communication system of claim 18 wherein, "a"=127; "b"=209; "c"=247; and "d"=255.

20. In a speech and data information low-rate encoded, digital speech interpolation communication system, an encoder comprising:
   (a) means for converting a plurality of serial data streams which are carrying a plurality of active input channels to n-bit samples wherein samples from each input channel are identified by an input channel number;
   (b) means for translating each of said input channels to an international channel wherein each international channel is identified by an international channel number;
   (c) means for determining whether said n-bit samples contain speech or data information;
   (d) means for detecting said data rate of said data information, if data information is present and classifying same;
   (e) means for delaying said n-bit samples;
   (f) means for searching a pool of available speech and data transmission channels, said pool consisting of a plurality of transmission channels capable of carrying (n−k)- (n−l) and (n−m)-bits per sample corresponding to data, speech and overload channels, respectively, wherein said transmission channels are identified by transmission channel numbers;
   (g) means for routing each of said international channels, taking into account whether said n-bit samples contain speech or data information and if data information is present, said data rate, to a selected one of said transmission channels into either (1) its presently assigned transmission channel, if it is presently assigned to a transmission channel, (2) a newly assigned transmission channel if it is not presently assigned a transmission channel, (3) a reassigned transmission channel or (4) a disconnect mode and generating "refresh", "new assignment", "reassignment" and "disconnect" messages, respectively;
   (h) means for routing said messages into an assignment channel;
   (i) means for steering said n-bit samples associated with its respective international channel to a selected one of a plurality of coders, said plurality of coders making up a pool of available coders, said coders being capable of operating selectively in the (n−k), (n−l) and (n−m)-bit modes wherein (n−k), (n−l) and (n−m-)-bit samples for the selected coder are directed to the selected speech or data transmission channel;
   (j) means for formatting said encoded samples in transmission channel pairs to form an n-bit word; and
   (k) means for multiplexing said assignment channel and the transmission channels into a low-rate encoded digital speech interpolation output.

21. A speech and data information low-rate encoded, digital speech interpolation (DSI) communication system of the type including means for receiving speech and data information via a plurality of receiving channels and means for transmitting said speech and data information in a frame comprising a plurality of transmission channels identified by transmission channel numbers, said transmission channels including data, speech and overload channels and said frame including a designated data area for data channels and a designated speech area for normal speech channels, said system being further characterized in that:
   (a) a first portion of the transmission channels in said designated data area of said frame comprise 5-bit data channels;
   (b) a second portion of the transmission channels in said designated data area of said frame comprise 3-bit overload channels each associated with one of said 5-bit data channels;
   (c) a portion of the transmission channels in said designated speech area comprise normal 4-bit channels; and
   (d) a portion of the transmission channels in said designated speech area comprise 3-bit overload channels derived from normal 4-bit speech channels.

22. The system of claim 21, wherein a portion of the transmission channels in said designated data area carry 4-bit speech.